US006928427B2

(12) United States Patent
Rajasekaran et al.

(10) Patent No.: US 6,928,427 B2
(45) Date of Patent: Aug. 9, 2005

(54) EFFICIENT COMPUTATIONAL TECHNIQUES FOR AUTHORIZATION CONTROL

(75) Inventors: Sanguthevar Rajasekaran, Los Altos, CA (US); Rajendra A. Gopalakrishna, Fremont, CA (US)

(73) Assignee: Arcot Systems, Inc., Sunnyvale, CA (US)

( * ) Notice: Subject to any disclaimer, the term of this patent is extended or adjusted under 35 U.S.C. 154(b) by 404 days.

(21) Appl. No.: 10/094,509

(22) Filed: Mar. 8, 2002

(65) Prior Publication Data

US 2002/0143766 A1 Oct. 3, 2002

Related U.S. Application Data

(60) Provisional application No. 60/274,469, filed on Mar. 9, 2001.

(51) Int. Cl.[7] ............................................... G06F 17/30
(52) U.S. Cl. ..................... 707/2; 707/3; 707/9; 707/10; 707/101; 707/102
(58) Field of Search ............................... 707/2, 3, 9, 10, 707/101, 102

(56) References Cited

U.S. PATENT DOCUMENTS

| 5,406,627 A | 4/1995 | Thompson et al. |
| 5,654,746 A | 8/1997 | McMullan, Jr. et al. |
| 5,999,978 A | 12/1999 | Angal et al. |
| 6,029,046 A | 2/2000 | Khan et al. |
| 6,154,741 A | 11/2000 | Feldman |

*Primary Examiner*—John E. Breene
*Assistant Examiner*—Hung Pham
(74) *Attorney, Agent, or Firm*—Philip H. Albert; Townsend and Townsend and Crew, LLP

(57) ABSTRACT

In an authorization system, access is defined by rules, roles and active rules. These definitions are preprocessed to form a bit array for each of a plurality of roles representing the rules that apply to that role. Once a bit array is calculated or generated for a given user based on that user's roles, the user bit array can be cached so that it need not be regenerated for each time the user requests access to resources. The rules used can either be role-based rules or active rules.

1 Claim, 5 Drawing Sheets

|    | R1 | R2 | R3 | R4 | R5 | R6 | R7 | R8 | R9 | R10 |
|----|----|----|----|----|----|----|----|----|----|-----|
| A1 | 0  | 0  | 0  | 0  | 0  | 0  | 0  | 0  | 0  | 0   |
| A2 | 0  | 0  | 0  | 0  | 0  | 0  | 0  | 0  | 0  | 0   |
| A3 | 0  | 0  | 0  | 0  | 1  | 0  | 0  | 0  | 0  | 0   |
| A4 | 0  | 0  | 0  | 0  | 0  | 0  | 0  | 0  | 0  | 0   |
| A5 | 0  | 0  | 0  | 0  | 0  | 0  | 0  | 0  | 0  | 0   |

FIG. 6

EFFICIENT COMPUTATIONAL TECHNIQUES FOR AUTHORIZATION CONTROL

FIELD OF THE INVENTION

The present invention relates to authorization systems in general and in particular to efficient authorization of access to resources.

BACKGROUND OF THE INVENTION

Sharing of resources provides for efficient use of resources in computing systems. With the increased use of the Internet, resources can be shared over an open network. Examples of resources include data, files, network channels, printers, hardware devices, software programs, virtual objects, input/output devices, storage space on storage media, bandwidth on a channel, and the like.

Whether user systems attempting to share resources are connected to the resources via an open network, such as the Internet or a closed network such as a credit card transaction network or local area network (LAN), it is important to ensure that only valid users have access to resources and that only permitted actions are performed by those users. One way of controlling access is by defining access rules and enforcing those access rules. A rule typically specifies the actions that can be performed on a resource. Examples of actions on a resource include creation, deletion, modification, viewing, viewing metadata about the resource, changing metadata about the resource, mounting, unmounting, sharing, unsharing, viewing, modifying or deleting metadata about rules and roles associated with the resource, creating and modifying trusteeships, and the like.

Several authorization control ("AC") systems are available commercially, however these systems suffer from high computational costs. An AC system requiring 200 to 300 milliseconds per authorization is not problematic where the access is several minutes long and one AC system responds to a few requests per minute, but where the accesses are very quick operations and an AC system must respond to many access requests per second, such a performance would be unacceptably slow.

There are many approaches that AC system vendors have taken to reduce the amount of computational effort needed per access request. Some AC system vendors approach the problem by adding more computing power to the effort so that response times would go down even without any reduction in computational effort. However, in order to be a significant improvement in offerings, an AC system should provide better response for a given amount of computing power. Such is essential on platforms where computing power is limited, such as on handheld computing devices and in large network transaction processing systems, where the computing power used by the AC system is so large that simply adding proportionately more computing power would be a significant investment. Other approaches include the use of 2–3 trees, red-black trees or hashing.

SUMMARY OF THE INVENTION

In one embodiment of an authorization system, access is defined by rules, roles and active rules. These definitions are preprocessed to form a bit array for each of a plurality of roles representing the rules that apply to that role. Once a bit array is calculated or generated for a given user based on that user's roles, the user bit array can be cached so that it need not be regenerated for each time the user requests access to resources. The rules used can either be role-based rules or active rules.

Other features and advantages of the invention will be apparent in view of the following detailed description and preferred embodiments.

DESCRIPTION OF THE DRAWINGS

FIG. 2 illustrates access request processes.

FIG. 6 is an illustration of a rule bit array.

DETAILED DESCRIPTION OF THE INVENTION

An authorization control (AC) system is described herein. One implementation of an AC system is an Arcot Systems AC server that responds to requests for authorization on the order of 10 microseconds per authorization.

Figure 1:
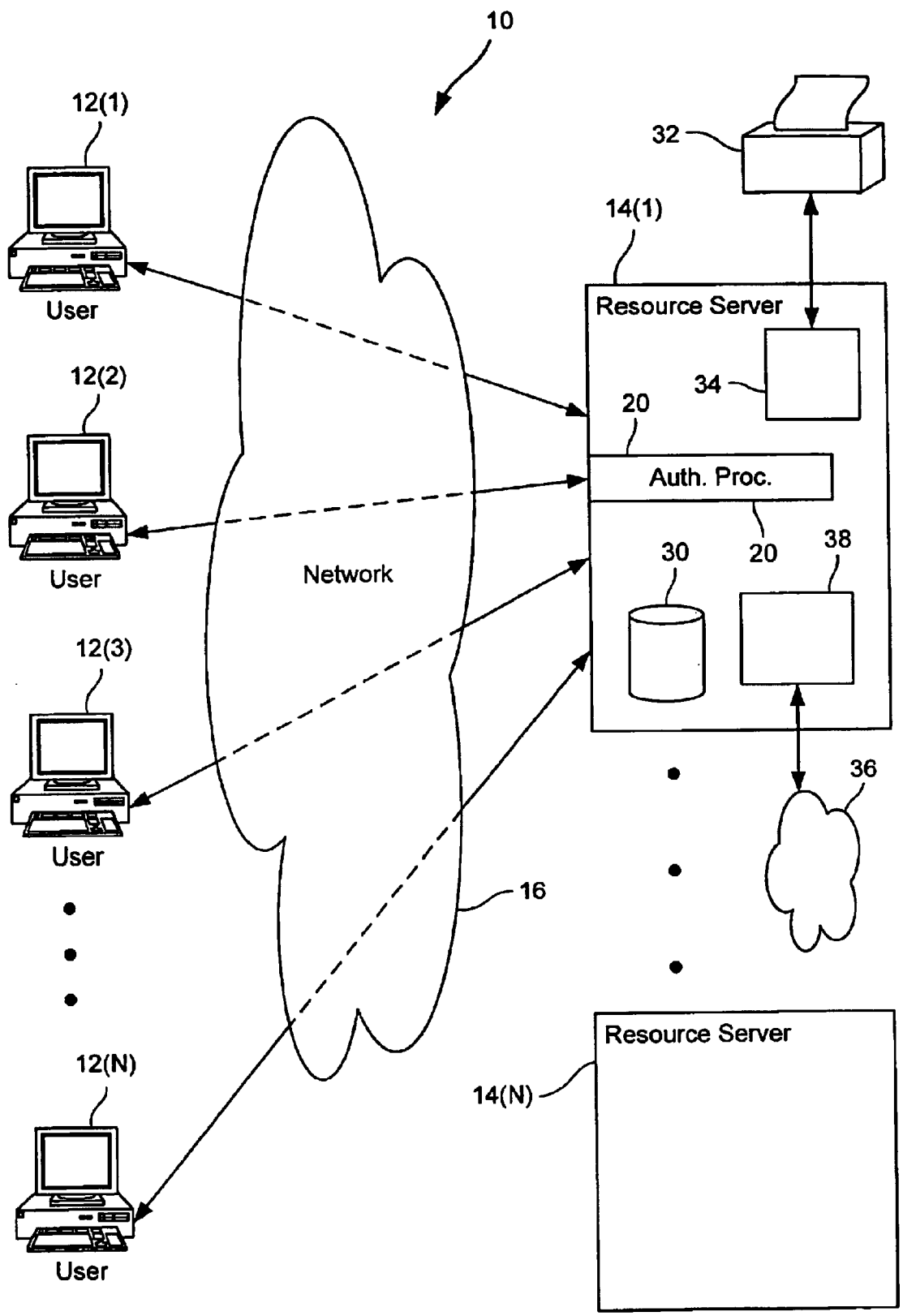
FIG. 1 is a block diagram of a network system in which authorizations take place to allow users access to resources.

FIG. 1 is a block diagram of a system 10 wherein the processes and apparatus of the present invention might be used. As shown there, various user systems 12 are coupled to various resource servers 14 via a network 16 using an authorization process 20. In some embodiments, user systems 12 are used to access resources available over the network known as the Internet, a global internetwork of networks. However, it should be understood that the invention is not limited to the Internet or particular resource servers. As one example of a resource server, resource server 14(1) provides access to resources such as data on data storage 30, a printer 32 accessible via a printer interface 34 or a secured network 36 accessible via a network interface 38. In some examples described herein, secured network 36 is a financial network, such as a credit card transaction network, but the invention is not limited to such networks.

Access to the resource might have different meanings for different resources. For example, access to data storage might include reading, writing, modifying, status checking, defragementing, or other tasks that are permitted to an authorized user. Some physical resources might be set up as multiple logical resources, with differing accesses. For example, a data storage device might be set up as a logical resource that can be read and as another logical resource that can be read, written to and as yet another resource that can be read, written to, controlled for defragmenting, formatting, or accessed for other control tasks.

A resource such as a printer would likely have a different set of accesses, such as reading a status, sending a print file, sending print controls, etc. A resource such as a messaging or transaction network would have accesses such as sending a message, receiving a message or directing control of the network or components thereof.

Figure 2A:
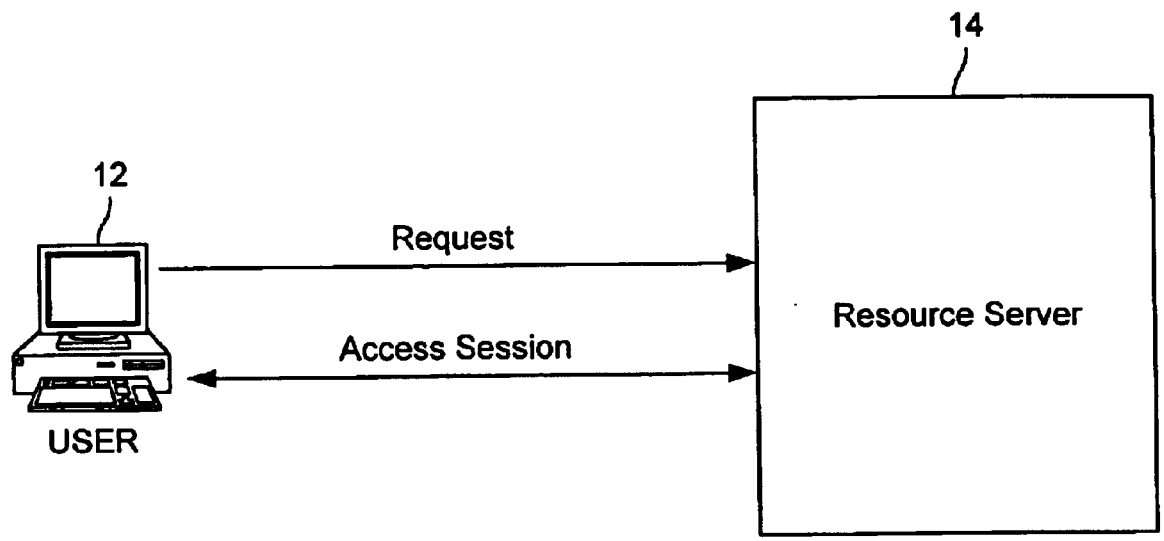
FIG. 2A illustrates access requesting where a resource server provides both authentication and access to a resource.
Figure 2B:
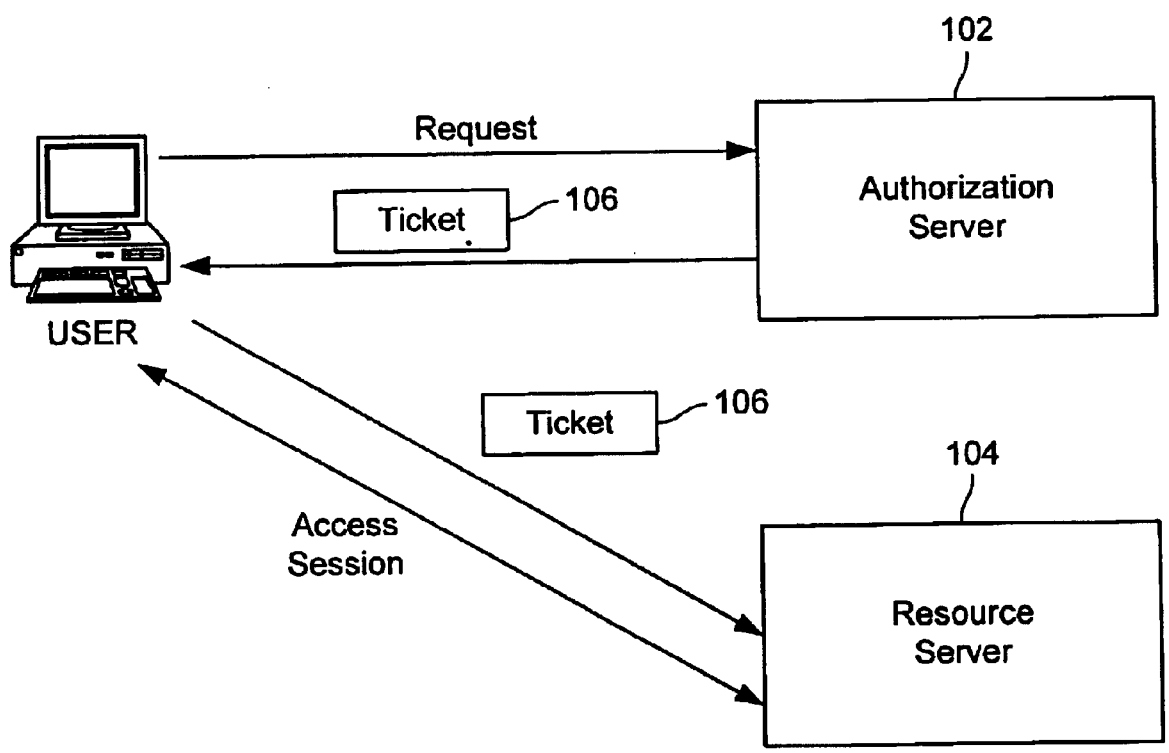
FIG. 2B illustrates access requesting where a resource server provides access to a resource and a separate authorization server provides authentication services.

FIG. 2 illustrates accessing a resource by an authorized accessor. FIG. 2A illustrates an embodiment wherein the resource server performs the authorization process and FIG. 2B illustrates an embodiment wherein authorization is separate from the resource server. As illustrated by FIG. 2A, user system 12 would send a request for access to a resource to resource server 14 and an access session would begin between user 12 and resource server 14. The session might comprise the user being authorized, followed by interaction with the resource, or might comprise the user failing authorization and being denied access to the resource.

The present invention is not limited to any particular protocol for accessing resources, but one protocol that might be used is TCP/IP over the Internet and HTTP to convey messages between nodes of network 16. For example, each resource (and possibly each mode of access of each resource) might have an assigned Uniform Resource Locator (URL) or Uniform Resource Indicator (URI) that user 12 would use to refer to the resource and/or the access mode.

FIG. 2B illustrates how authentication might be distinct from the resource server. As shown there, the user sends an access request to an authorization server 102. If the authorization is granted, authorization server 102 returns a ticket 106 to the user and the user provides ticket 106 to a resource server 104 as an indication that access is to be provided. Resource server 104 and the user can then establish an access session wherein the user makes the authorized accesses. For example, the user might request access to read a particular file and makes the request to authorization server 102. Once authorization server 102 determines that the user is authorized to read that file, it sends ticket 106 to the user. Presumably, the operators of resource server 104 and authorization server 106 have agreed on the process whereby users can be authenticated and what accesses would be allowed. When resource server 104 receives ticket 106, a session is established between resource server 104 and the user system. This session can be a stateless session, such as an HTTP session, or a stateful session. The communications between the user system and resource server 104 can either be secure or insecure. For example, the user system might present ticket 106 to get access to read a file and resource server 104 might immediately respond to the ticket by transmitting the file being read to the user system. In the case of more involved interactions, such as authorized access to an XML server, resource server 104 might respond with an encrypted message containing a session key that the user system then uses to securely communicate with the XML server.

It should be understood that the following descriptions apply to either system shown in FIG. 2, unless otherwise specified. Further, it should be understood that the separation between the authorization server and the resource server in the latter example might be nothing more than a logical separation, such as where the resource server and the authorization server are distinct processes running in there own spaces on a common processing system. Thus, there is a continuum between the configuration of FIG. 2A and the configuration of FIG. 2B. For example, the authorization server and the resource server might be separate machines, but controlled by a common party, operated from a common network node and/or stored in a common location.

Figure 3:
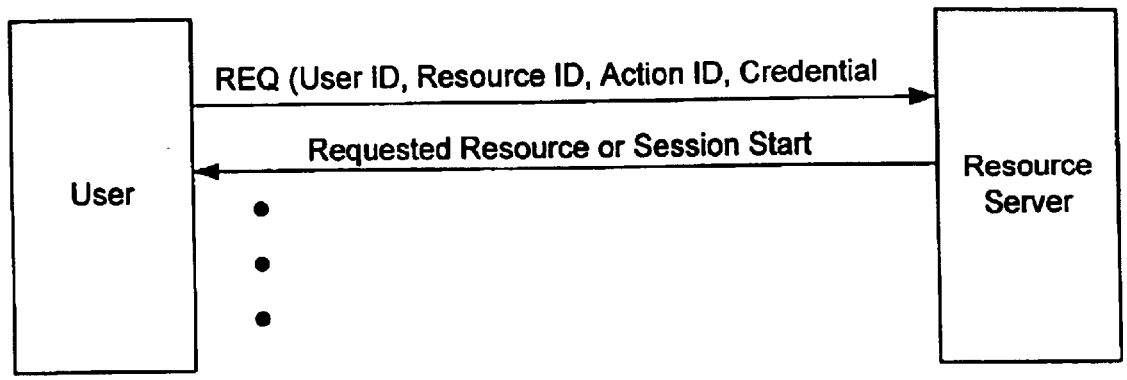
FIG. 3 illustrates an interaction between a user system and a resource server to request and obtain access to a resource served by the resource server.

Authorization can be modelled as a process of deciding whether a requester will be provided access to a resource that is under the control of an authorization system. More specifically, the authorization server needs to determine if a requestor $U_x$ will be allowed to perform action $A_y$ with a requested resource $R_z$. Referring now to FIG. 3, an example of an access request and response is there shown.

In FIG. 3, a request includes references to a USER-ID, a RESOURCE-ID, an ACTION-ID and a credential. Thus, the request includes enough information to allow an authorization processor to perform the above-described authorization. Not all implementations need include credentials in the request, as some systems might be able to use other methods of determining if the request in fact came from the user identified by the USER-ID. Of course, a request can include other fields, as needed, such as a point to where the response is to be directed, or subfields such as an action or resource subfield that allows for specifying specific subactions of an action, specific subresources or a plurality of actions/subactions/resources/subresources in one request.

In a specific implementation, the resources under control are $R_1, R_2, \ldots, R_r$, the possible actions (or labels associated with the possible actions) are $A_1, A_2, \ldots, A_a$ and each resource $R_i$ is representable by a uniform resource identifier (URI) that is representable by a label comprising a string of characters, however other representation schemes might be used instead. These resource representations (or their labels) can be stored in an appropriate data structure such as one of the structures described in (U.S. patent application Ser. No. 10/006,179 entitled "Efficient Searching Techniques" filed Dec. 4, 2001) and U.S. Prov. Pat. App. 60/262,320 entitled "Techniques to Facilitate Efficient Searching" filed Jan. 17, 2001 (hereinafter "Gopalakrishna et al."). The disclosure(s) therein is(are) incorporated by reference herein for all purposes. The action labels can be stored in a suitable data structure, such as a conventional red-black tree. Details of red-black trees and their uses can be found, for example, in E. Horowitz, S. Sahni, and S. Rajasekaran, *Computer Algorithms* (W. H. Freeman Press, 1998). Using the above nomenclature, an access request from a user can be thought of as a pair (R, A) representing a user request to perform action A on resource R.

Figure 4:
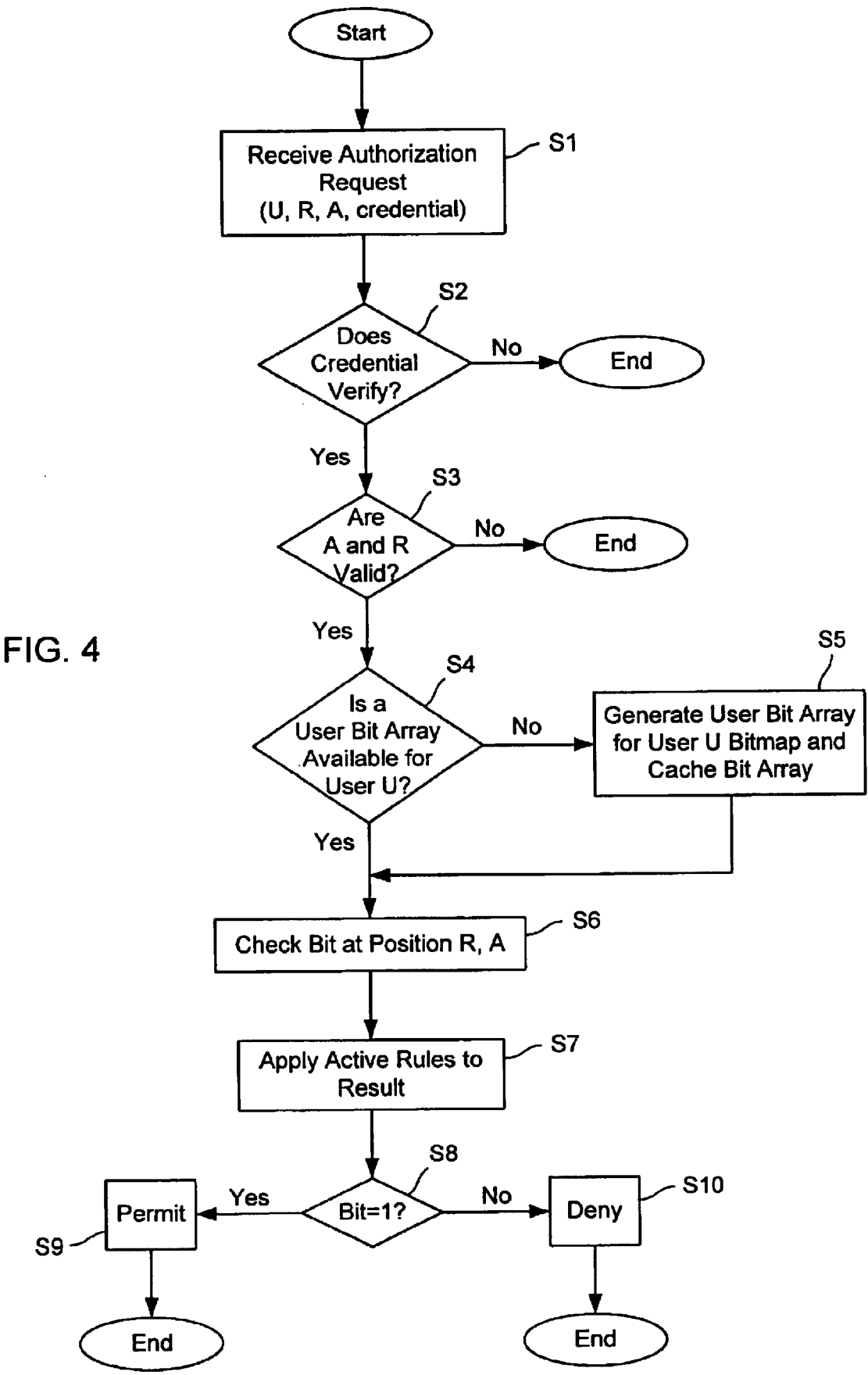
FIG. 4 is a flowchart of a process for authentication according to aspects of the present invention.

FIG. 4 is a flowchart illustrating an authorization process as might be performed by an AC system such as those shown in the other figures. The steps are referenced in the figure with labels S1, S2, . . . , which are also indicated parenthetically in the text below. Once a request (U, R, A, cred) is received (step S1), the AC system checks the credential (S2) and, if the credential does not verify, ends the authorization process without further extensive processing and returns a rejection to the request. In embodiments where credentials are not used or needed, step S2 can be skipped.

Next, if the credential verifies or is not checked, the AC system checks that action A and resource R are valid (S3).

In particular, the AC system might check a resources data structure such as described above and an actions data structure such as described above to check if A is a valid action, R is a valid resource. If either the action or the resource is invalid, the request is denied immediately.

If the resource and action are valid, then the AC system checks if user U is entitled to perform action A on resource R. This check must often be done very quickly, as an operation performed by the user that the user expects to complete quickly might involve many actions on many resources. Also, this check must often be done with few computational resources, as an AC system might be called to handle millions of checks in short periods of time. This check can be done quickly with little effort, through the use of RA bit arrays.

An RA bit array is a two-dimensional (2D) bit array of size r×a, where r is the number of possible resources and a is the number of possible actions. An RA bit array might be a compressed array that takes up less than r×a memory locations and/or a virtual array where not all of the (R, A) pairs are represented in the bit array. For an unpermitted (R, A) combination (i.e., action A is not permitted on resource R), that entry in the bit array would be "0" and for a permitted combination the entry would be "1". Thus, the AC system need only check a bit in an RA bit array for user U to determine whether or not to allow the access. In a specific embodiment, r might be around 10,000 and a might be around 10, in which case consumption for the array is not an issue. Even if it were, other data structures, such as 2–3 trees, etc. could be used to save on memory.

In step S4, the AC system determines whether an RA bit array already exists for user U. If not, one is generated and cached (S5). This saves much computational effort. Once the RA bit array is available for user U, the AC system checks the bit at the array index [R, A] (S6). The AC system then applies active rules that are not reflected in the RA bit array (S7) to the bit obtained in step S6. The bit is then checked (S8). If it is 1, the access is permitted (S9), otherwise, the access is denied (S10).

Authorizations can be defined by rules, where a rule is expressible as a triple of the form (R, A, B), where R is a resource (or resource label), A is an action (or action label), and B is a bit. If B is 1, the rule permits action A on resource R. If B is 0, then the rule prohibits action A on resource R. Each rule can be represented by an r×a bit array, where r is the total number of available resources and a is the total number of possible actions. All the entries in that array will be zeros except for the entry indexed [A, R], which is set to 0 or 1 depending on the value of B. FIG. 6 illustrates such a bit array used where there are 10 resources and five possible actions. That bit array represents the rule ($R_5$, $A_3$, 1). Rules might be specific to users, so that the bit arrays for one user might differ from the bit arrays for another user.

Rules can be grouped into roles. A role might correspond to a status in an organization (for example, manager, engineer, programmer, etc.). A role can be represented as a two-dimensional (2D) bit array that is the logical OR of bit arrays corresponding to the each of the rules in the role. A system administrator can define rules and roles for the organization. A user can have more than one role. For instance, a manager can also be a programmer. Bit arrays for roles can be precomputed so that each authorization request can refer to a precomputed role bit array instead of having to compile all of the applicable rules each time a request is made.

Each user recognized by the AC system has an associated set of roles applicable to that user, as might be indicated in a user database of roles. Some user databases might have a role of "anyone" that includes all the users. Some of the rules corresponding to a user might be conflicting, as a rule for one of the user's roles might bar an action on a resource and another role might allow the action on the resource. For example, where the user has two roles, one role might have the rule ($R_8$, $A_2$, 1) and the other role might have the rule ($R_8$, $A_2$, 0). In such cases, the more permissive rule would take precedence, although other arrangements are possible. Thus, access information relevant to a user can be represented as a 2D bit array that is the OR of the bit arrays corresponding to the roles or rules applicable to the user. This 2D bit array is referred to as a "user bit array". As explained above, a user has associated roles and the AC system has access to bit arrays associated with each of the roles. Once a user bit array is generated, it can be cached to speed up the authorization process.

The caching could be single-tiered, but also could be multi-tiered, and with some of the tiers in the processor and some of them in secondary storage devices such as disks.

Figure 5:
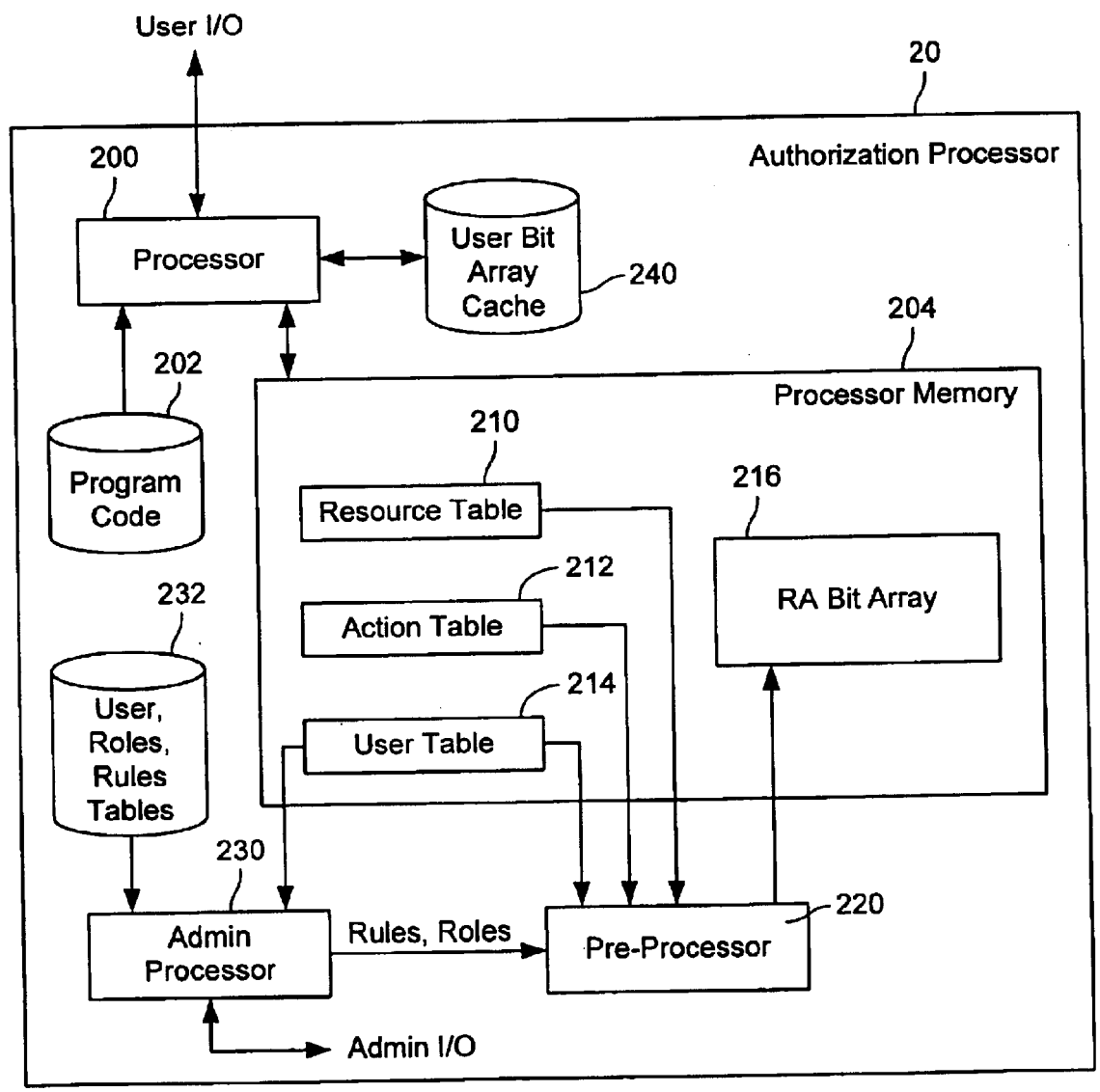
FIG. 5 is a block diagram of an authorization processor as might be used in the resource server shown in FIG. 1.

FIG. 5 is a block diagram of an authorization processor 20 as might be used in the resource server shown in FIG. 1. Authorization processor 20 is shown comprising a processor 200, program code storage 202, processor memory 204 and other elements. Processor 200 performs operations as indicated by program code stored in program code storage 202. Such operations might be those described herein, such as in FIG. 4, and other operations.

Processor memory 204 is shown including a resource table 210, an action table 212, a user table 214 and RA bit array storage 216. It should be understood that the arrangement of data in processor memory 204 is not limited to tables, but might be other database structures or other data storage structures. For example, resource table 210 might be constructed using techniques described in Gopalakrishna et al. Processor memory 204 might also contain other data structures not shown. Preferably, processor memory is a fast memory and all of the data needed to quickly generate a user bit array is available in that fast memory.

Authorization processor 20 is also shown including a preprocessor 220, an admin processor 230 and a user bit array cache 240. Preprocessor 220 can read from resource table 210, action table 212 and user table 214 to generate RA bit arrays for given roles. Preprocessor 220 might maintain a set of roles and rules, or obtain them from admin processor 230. Admin processor 230 maintains storage 232 for user, role and rule information can be supplied to preprocessor 220 and that might be obtained from an administrator (person, persons or system) through administrator I/O.

Prior to a user request for authorization, as might be received from processor 200 via user I/O, and administrator can define rules, roles and associate users with roles. Admin processor 230 can then populate data structures with those definitions and provide such information to preprocessor 220. Preprocessor 220 can then generate RA bit arrays for each of the roles. Once a user request is received, processor 200 can check cache 240 for a user bit array for that user and if one does not exist, access processor memory 204 to obtain enough information to generate a user bit array. Processor 200 then uses the user bit array to determine whether to allow or deny the request and caches the user bit array in cache 240.

Admin processor 230 allows for entry of rules that can be defined and applied during run time. This feature lets the administrator define rules that cannot be specified with roles. It is possible to encode all possible rules as appropriate roles, but such encoding would use large amounts of memory and computing time to handle. For instance, the following rules are possible: "If the user is less than 21 years old, he/she cannot access object O", "If the time is outside 9 AM to 5 PM object O cannot be accessed", etc. These rules are "active rules". Rules can be defined ahead of time, but with active rules, they can be defined on the fly.

Authorization can be modelled as a search problem, where a search seeks the answers to the questions: "which user?", "which roles?", "which groups?", "which resource?", "what operations?", "what rules?", etc. Several conventional data structures (such as heaps, red-black trees, etc.) can be used in the search process. Gopalakrishna et al. describes novel data structures for searching URIs that perform better than many conventional data structures.

Parallel processing techniques such as spin-locks and reader/writer mutexes can be used to improve performance. The locks can be read locks or write locks. A mutex can be a reader-preferred mutex, which gives preference to read requests, or a writer-preferred mutex, which gives preference to write requests.

What is claimed is:

1. A computer implemented method of processing authorization requests, wherein an authorization request received from a user system is a request to allow a user of that user system to access to a resource to perform an action on that resource, the method comprising:

prior to receipt of the authorization request from the user system, generating a plurality of role bit arrays for a plurality of roles, wherein a role bit array indicates which actions are allowed with which resources for that role;

upon receipt of the authorization request, determining if a user bit array associated with that user exists, wherein a user bit array is a bit array indicating, for the user associated with the user bit array, which actions are allowed with which resources;

if the user bit array does not exist, generating a user bit array from at least one role bit arrays for roles associated with the user;

if the user bit array is generated, at least temporarily storing the generated user bit array for use with subsequent requests from that user;

applying rules to at least one bit of the user bit array where the rules are not entirely encoded in the user bit array or the role bit arrays used to determine the user bit array;

identifying an authorization flag at an index in the user bit array corresponding to the requested resource and the requested action;

responding to the authorization request by either allowing the access or denying the access, based on the identified authorization flag.

* * * * *